(12) United States Patent
Prochnow et al.

(10) Patent No.: US 6,502,335 B2
(45) Date of Patent: Jan. 7, 2003

(54) FRICTION DRIVE CABLE SHIFTER

(75) Inventors: Perry Prochnow, Brillion, WI (US); John Adrian, Oshkosh, WI (US); Scott Deschler, Kaukauna, WI (US)

(73) Assignee: Ariens Company, Brillion, WI (US)

( * ) Notice: Subject to any disclaimer, the term of this patent is extended or adjusted under 35 U.S.C. 154(b) by 26 days.

(21) Appl. No.: 09/811,294

(22) Filed: Mar. 16, 2001

(65) Prior Publication Data

US 2002/0174572 A1 Nov. 28, 2002

(51) Int. Cl.⁷ .................................................. E01H 5/09
(52) U.S. Cl. ............................. 37/244; 476/24; 476/57
(58) Field of Search .......................... 37/257, 244, 242, 37/247, 248; 476/24, 26, 55, 56, 57, 58; 172/42, 107

(56) References Cited

U.S. PATENT DOCUMENTS

| | | | | |
|---|---|---|---|---|
| 1,125,132 A | * | 1/1915 | Lambert | |
| 2,942,487 A | * | 6/1960 | Claus | |
| 3,059,397 A | * | 10/1962 | Anderson et al. | |
| 3,327,546 A | * | 6/1967 | Gordon et al. | |
| 3,473,622 A | * | 10/1969 | Orr | |
| 3,529,482 A | * | 9/1970 | Jackson et al. | |
| 3,580,351 A | | 5/1971 | Mollen | |
| 3,613,814 A | * | 10/1971 | Prien, Jr. | |
| 3,631,730 A | * | 1/1972 | Hadler | |
| 3,667,304 A | * | 6/1972 | Puffer et al. | |
| 3,678,770 A | * | 7/1972 | Enters et al. | |
| 3,813,954 A | * | 6/1974 | Price et al. | |
| 3,986,414 A | * | 10/1976 | Peterson et al. | |
| 4,011,668 A | | 3/1977 | Gunderson | |
| 4,169,392 A | * | 10/1979 | McDonald | |
| 4,173,153 A | * | 11/1979 | Klug et al. | |
| 4,270,400 A | * | 6/1981 | Fodor | |
| 4,502,344 A | * | 3/1985 | Klug | |
| 4,580,669 A | * | 4/1986 | Marto | |
| 5,735,064 A | | 4/1998 | Holl | |

OTHER PUBLICATIONS

White Outdoor Products Company; White Operator's Manual; 7/99; Form No. 770–10027A; Cleveland, Ohio.

* cited by examiner

Primary Examiner—Victor Batson
(74) Attorney, Agent, or Firm—Michael Best & Friedrich, LLP

(57) ABSTRACT

A self-propelled power implement having a friction drive system to transmit rotation from the engine to the wheels. The friction drive system includes an output disc and a friction disc. The output disc rotates in response to rotation from the engine's output shaft. The friction disc is coupled to the implement's wheels, and contacts the output disc and rotates in response to rotation of the output disc. The location on the output disc that the friction disc contacts determines the rotation speed of the friction disc. A flexible member is interconnected to the friction disc and a controller, and movement of the controller causes the flexible member to actuate the friction disc radially in relation to the output disc. The flexible member adjusts the location on the output disc that the friction disc contacts, and thereby adjusts the rotation speed of the friction disc and the wheels.

13 Claims, 6 Drawing Sheets

FRICTION DRIVE CABLE SHIFTER

FIELD OF THE INVENTION

The present invention relates to self-propelled power implements, and more particularly to a speed control mechanism for a friction drive system of a self-propelled power implement.

BACKGROUND OF THE INVENTION

Self-propelled power implements are commonly devices such as lawn mowers, lawn tractors, trimmers, tillers, or snow throwers, and are used for general outdoor applications such as landscaping, gardening, lawn care, or snow removal. These implements usually include an engine, and a means of transferring power from the engine to the wheels to propel the implement. Various types of transmissions are used to perform this task of transferring the power, and a friction drive system is an example of a transmission used for this purpose. Friction drive systems have proven to be an inexpensive, yet effective method of transferring power from the engine to the wheels and driving self-propelled power implements.

Friction drive systems commonly include two contacting discs: an output disc interconnected to the engine, and a friction disc interconnected to the wheels. These discs are often aligned transversely, and the rotation of the drive disc will cause the friction disc to rotate when the discs are engaged at a contact point. The output disc generally rotates at a relatively constant speed, and the friction disc rotates at a speed corresponding to the distance between the contact point and the center of the output disc.

Prior art friction drive systems have used a rigid structure to move the friction disc relative to the output disc, thereby moving the contact point and varying the speed of the friction disc and the wheels. These rigid structures frequently include a series of levers, bars, pivot joints, and sliding joints. A problem associated with the rigid structures is that the parts may become lodged or stuck, and may not pivot or slide smoothly. Further, the levers, bars, and joints must be properly aligned to function, and damage to even one of the parts can misalign and jam the shifting mechanism and render it inoperable. Adding to the problem is the fact that self-propelled power implements are often used for outdoor applications under harsh conditions.

SUMMARY OF THE INVENTION

The present invention provides a self-propelled power implement having a cable shifter system to adjust a friction drive system. The cable shifter system preferable requires relatively few moving parts and may be configured to smoothly move the friction drive system through an infinite number of settings.

The self-propelled power implement includes a frame, a pair of wheels coupled to the frame, an engine, an output disc, a friction disc, a flexible member, and a controller. The output disc is interconnected to the engine, and rotates in response to rotation of the engine's output shaft. The friction disc contacts the output disc, and rotates in response to rotation of the output disc. The friction disc is coupled to the wheels and transmits the rotation of the output disc to rotation of the wheels. The rotation axis of the output disc is preferably transverse to the rotation axis of the friction disc.

The flexible member is interconnected between the controller and the friction disc. Movement of the controller is transmitted through the flexible member to actuate the friction disc. The friction disc moves radially with respect to the output disc, and this movement varies the speed of rotation of the wheels. In the preferred embodiment, the flexible member includes first and second cables that actuate the friction disc in first and second opposite directions, respectively, with respect to the output disc. Alternatively, the flexible member may include a single push-pull cable capable of actuating the friction disc in both the first and second directions.

The controller preferably includes a control bracket, a cable guide, and a shifter plate. The cable guide has a cam surface and is mounted for rotation with respect to the control bracket. Preferably, the flexible member at least partially winds around a portion of the cam surface. The shifter plate is mounted to the cable guide such that the cable guide is between the shifter plate and control bracket, and rotates with the cable guide with respect to the control bracket. The shifter plate has a peripheral portion that extends slightly beyond the cable guide and defines a channel between the shifter plate and control bracket that facilitates winding the flexible member onto the cam surface. A shifter is preferably interconnected to the shifter plate, and movement of the shifter causes rotation of the shifter plate and cable guide. Preferably, moving the shifter in a first direction will apply tension in the first cable, and moving the shifter in a second direction will apply tension in the second cable.

In the preferred embodiment, a spring biases the shifter plate towards the control bracket, and applies a sandwiching pressure on the cable guide. The shifter plate may be rotated with respect to the control bracket under the influence of an external force applied to the shifter, but the frictional forces caused by the spring resist movement of the shifter plate in the absence of such an external force. This potentially allows the shifter plate to be smoothly adjusted to an infinite number of positions with respect to the control bracket.

Figure 1:
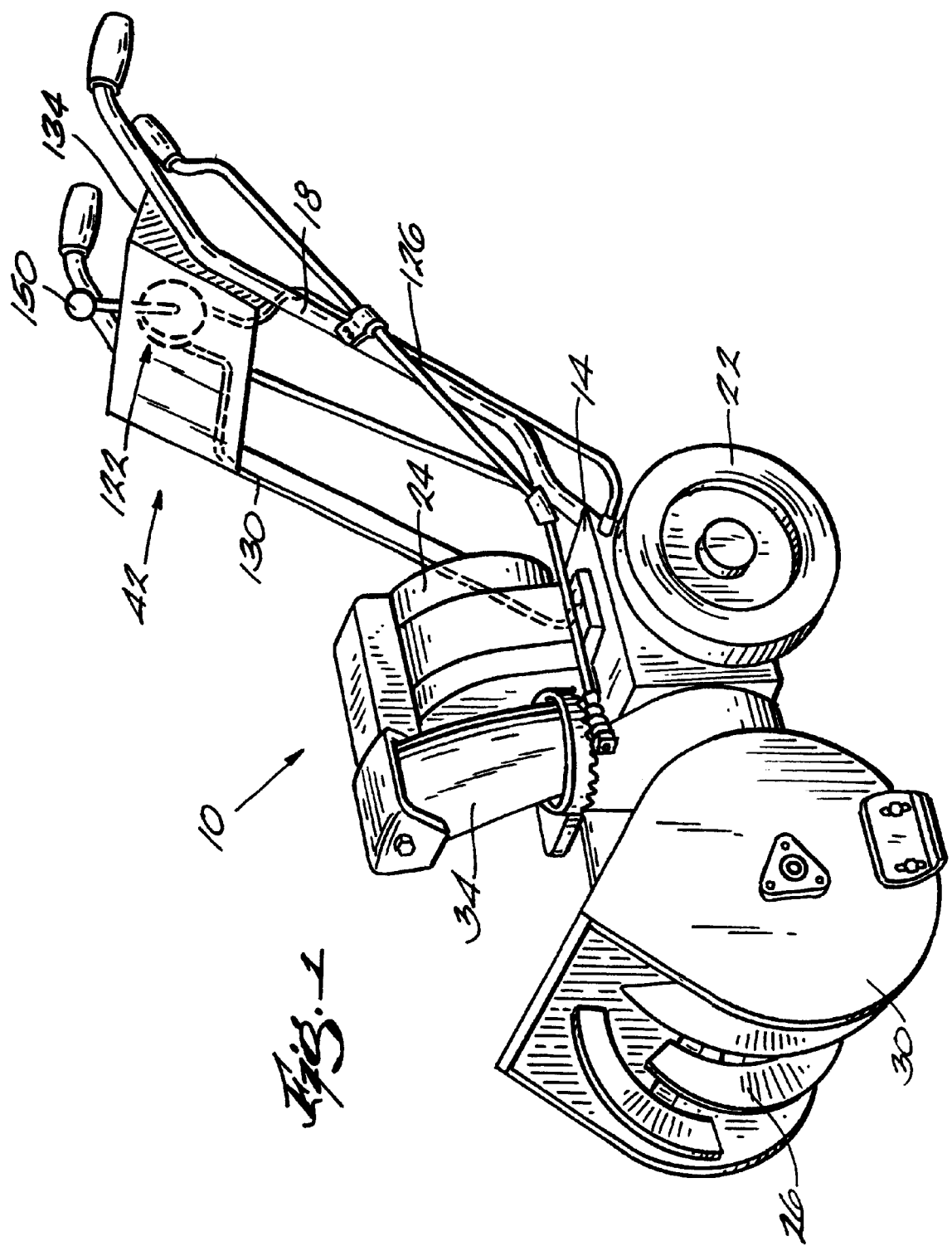
FIG. 1 is a perspective view of a snow thrower embodying the present invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

The present invention is an apparatus and method for adjusting a friction drive system for a self-propelled power implement. FIG. 1 illustrates a snow thrower 10 embodying the present invention, but the invention can also be embodied in other self-propelled power implements, such as lawn mowers, trimmers, tillers, utility tractors, or other similar devices. The snow thrower 10 in FIG. 1 includes a frame 14, a handle 18, wheels 22, an engine 24, an auger blade 26, an auger guard 30, and a deflector chute 34.

Figure 2:
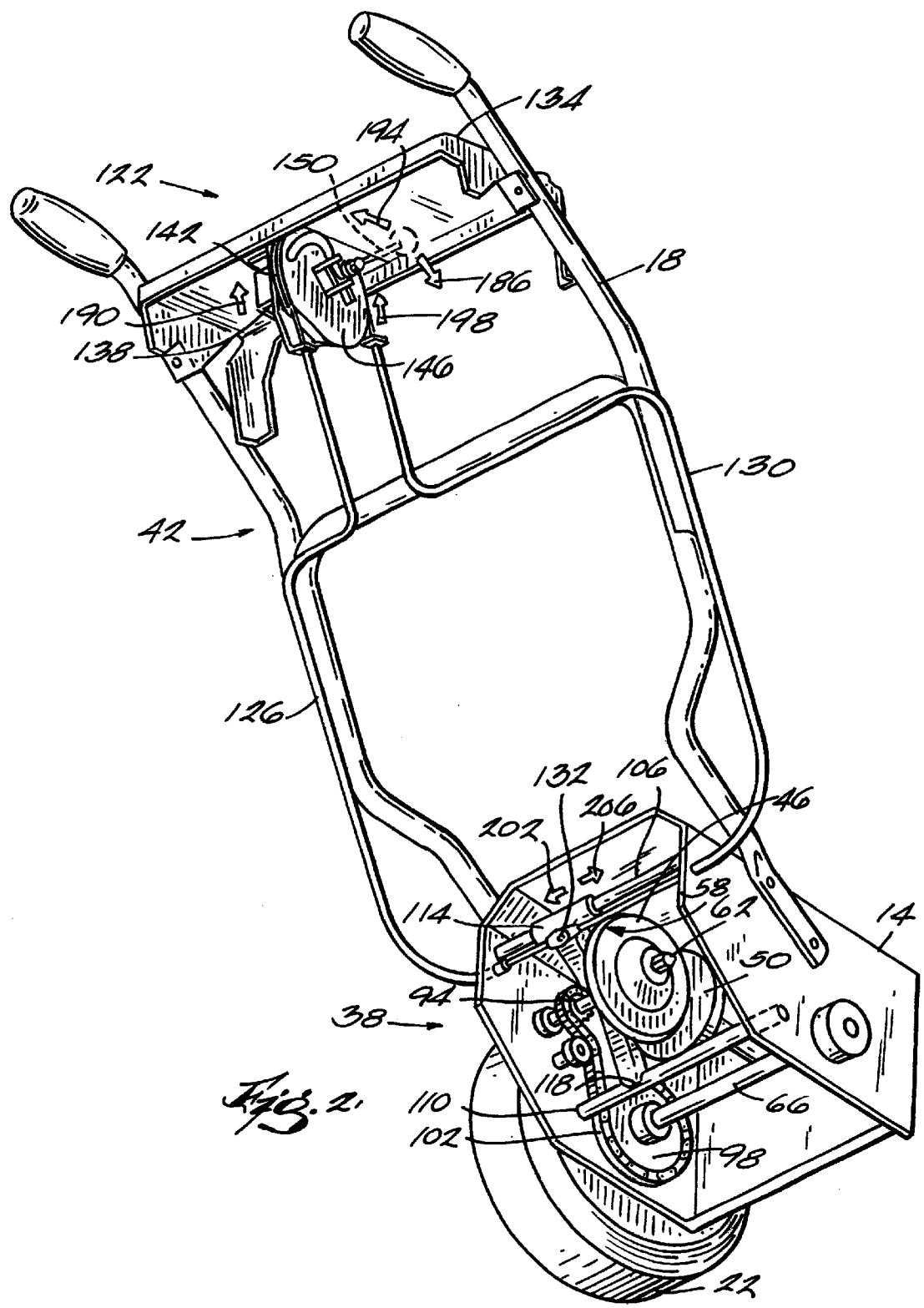
FIG. 2 is a perspective view of a portion of the snow thrower of FIG. 1, as viewed from behind and below the snow thrower.

As shown in FIG. 2, the preferred embodiment of the present invention essentially consists of two systems: a friction drive system 38, and a cable shifter system 42. The friction drive system 38 transfers power from the engine 24 (FIG. 4) to the wheels 22. The cable shifter system 42 controls where a friction disc 46 contacts an output disc 50, and regulates the speed that is transferred from the engine 24 (FIG. 4) to the wheels 22. The point on the output disc 50 that the friction disc 46 contacts is referred to herein as the "contact point."

Figure 3:
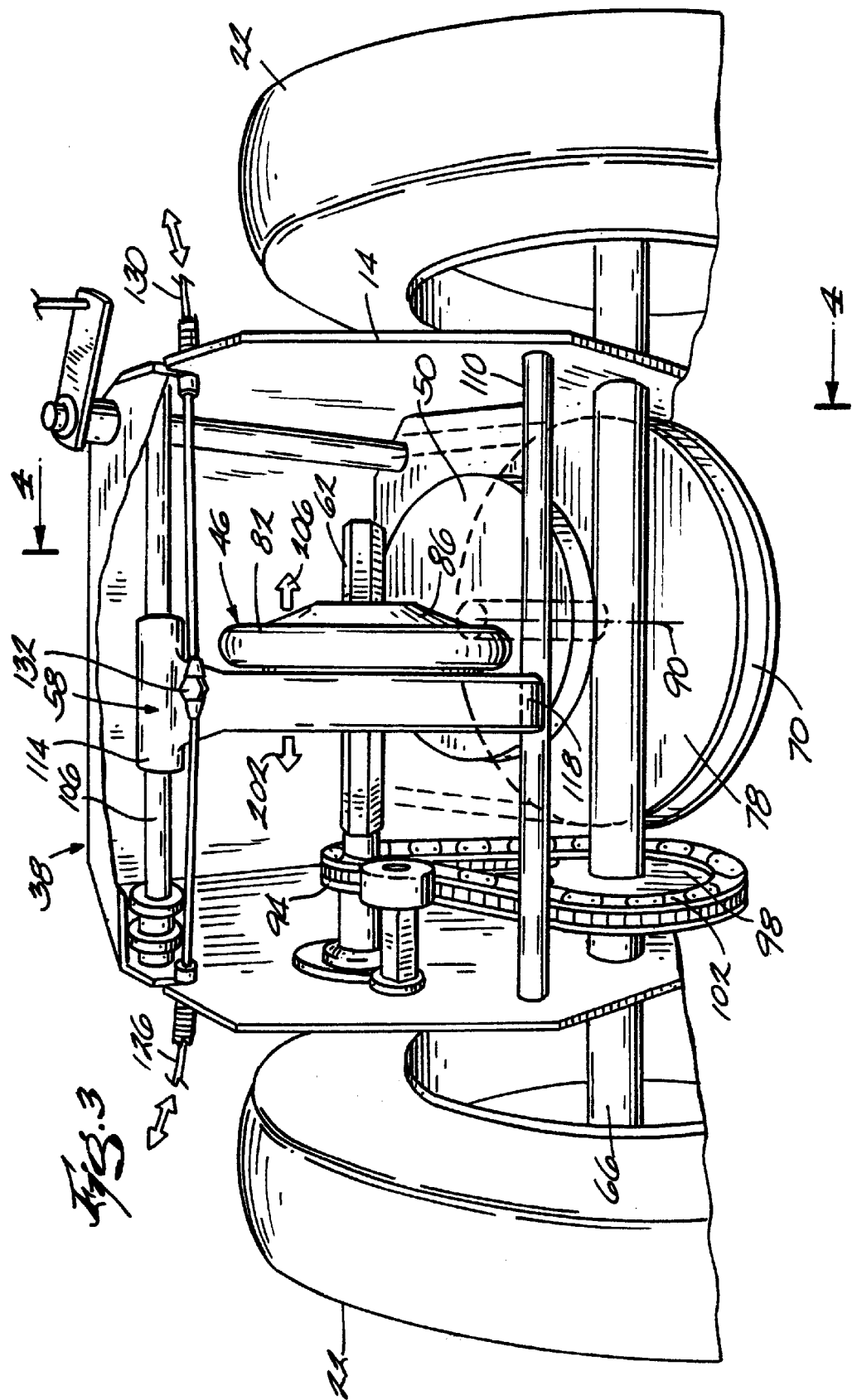
FIG. 3 is an enlarged perspective view of a portion of the snow thrower of FIG. 1, as viewed from below the snow thrower.
Figure 4:
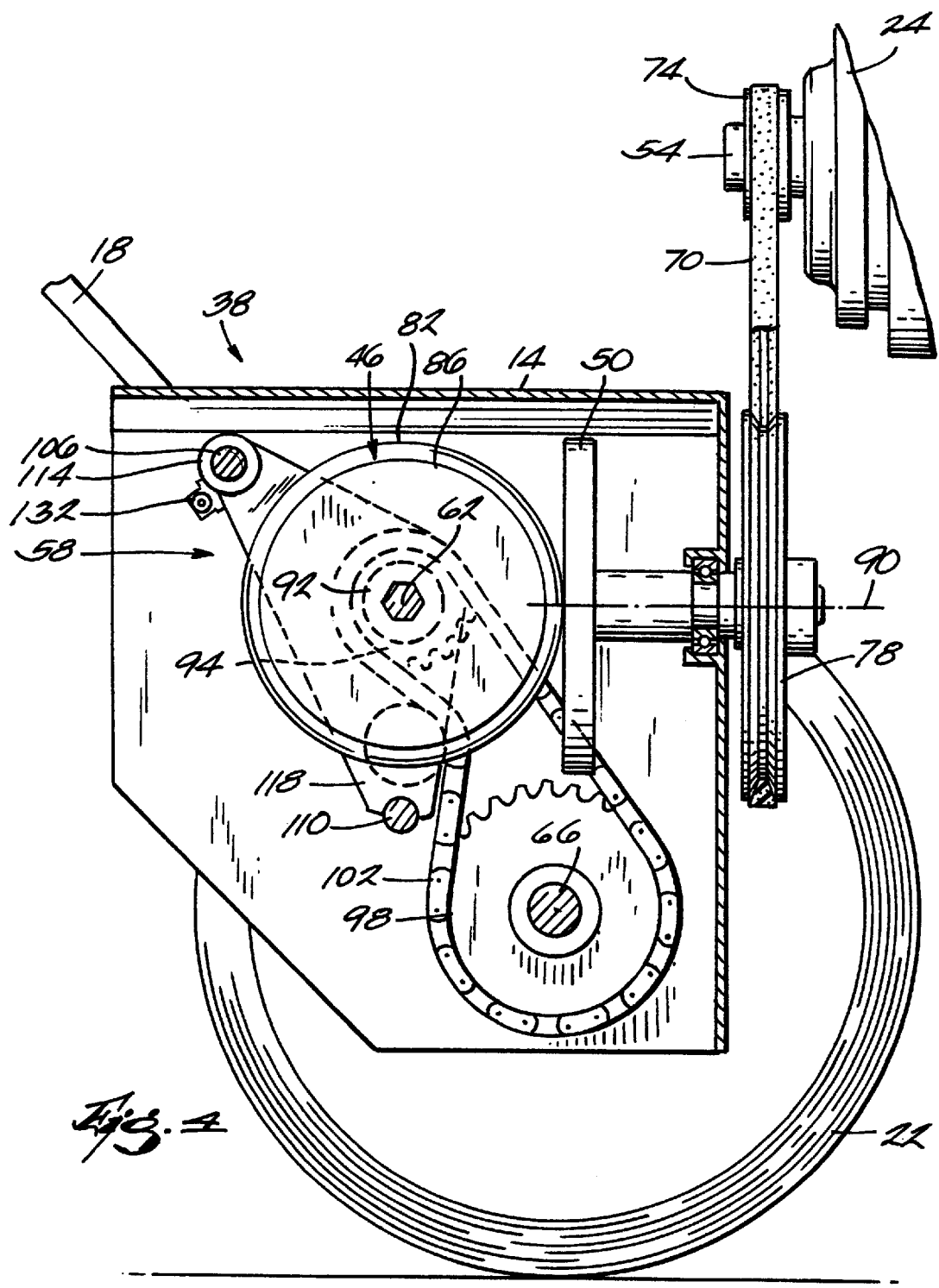
FIG. 4 is a cross-sectional view, taken along line 4—4 of FIG. 3

The friction drive system 38, illustrated in FIGS. 2, 3 and 4, includes the engine 24, an output shaft 54, the output disc 50, the friction disc 46, a carrier 58, a friction disc shaft 62, an axle 66, and wheels 22. The friction drive system 38 is at least partially disposed within the frame 14, and the engine 24 is interconnected to the frame 14. The engine 24 is an internal combustion engine, and rotates the output shaft 54, which rotates the output disc 50. In the preferred embodiment, a belt 70 and a pair of pulleys 74, 78 are used to transfer rotation from the output shaft 54 to the output disc 50.

The friction disc 46 preferably includes a friction surface 82 and a hub 86. The friction surface 82 is preferably made from a material with a high friction value, such as rubber, and is similar to a tire in that regard. Due to the contact between the friction disc 46 and output disc 50, the friction disc 46 rotates in response to rotation of the output disc 50. Rotation of the friction disc 46 causes rotation of the friction disc shaft 62, axle 66, and wheels 22.

The speed of rotation of the friction disc 46 depends on the position of the contact point with respect to the center of the output disc 50. An output disc rotation axis 90 passes approximately through the center of the output disc 50. The further the contact point is from the center of the output disc 50, or the rotation axis 90, the faster the friction disc 46 rotates. Also, the direction the friction disc 46 rotates will reverse if the contact point moves across the rotation axis 90 from one side of the output disc 50 to the other side.

The friction disc 46 is interconnected with the carrier 58, and is free to rotate with respect to the carrier 58. The carrier 58 and the friction disc 46 are free to move along the length of the friction disc shaft 62. There is preferably a bearing 92 between the carrier 58 and the friction disc shaft 62 that facilitates sliding of the carrier 58 along the length of the friction disc shaft 62. In the preferred embodiment, the friction disc shaft 62 is a cantilevered shaft that is only coupled to the frame 14 at one end, however a shaft with both ends coupled to the frame could also be used. The friction disc shaft 62 is a hex-shaft in the preferred embodiment, although any multi-sided shaft could be used. The friction disc 46 is coupled to the friction disc shaft 62 by way of a hex bore. Rotation of the friction disc shaft 46 is transferred to the wheels 22 through a pair of sprockets 94, 98 and a chain 102.

In the preferred embodiment, a carrier shaft 106 and a guide shaft 110 are interconnected to the frame 14, and are substantially parallel to the friction disc shaft 62. The carrier shaft 106 and guide shaft 110 support and retain the carrier 58. A carrier bracket 114 surrounds the carrier shaft 106, and allows the carrier 58 to move linearly along the carrier shaft 106. Similarly, a carrier guide 118 is interconnected to the guide shaft 110 and supports the carrier 58 while allowing the carrier 58 to move linearly along the guide shaft 110.

Turning now to FIGS. 1, 2, 5, and 6, the cable shifter system 42 adjusts the friction drive system 38 by moving the contact point between the output disc 50 and the friction disc 46. As shown in FIG. 2, the cable shifter system 42 includes the carrier 58, a controller 122, and a flexible member. Preferably, the flexible member is comprised of a first cable 126 and a second cable 130 that are interconnected between the carrier 58 and the controller 122. The cables 126, 130 are coupled to the carrier 58 at a cable joint 132, and convert rotational movement of the controller 122 into translational movement of the carrier 58. Alternatively, the pair of tension cables 126, 130 may be replaced with a single push-pull cable 133, as illustrated in phantom in FIG. 6.

The handle 18 is coupled to the frame 14 and extends away from the frame 14. A control panel 134 is located near the end of the handle 18 opposite the frame 14, and the controller 122 is mounted to the control panel 134. In this regard, the controller 122 may be considered remote from the engine. The cables 126, 130 may be interconnected along the sides of the handle 18 for support.

Figure 5:
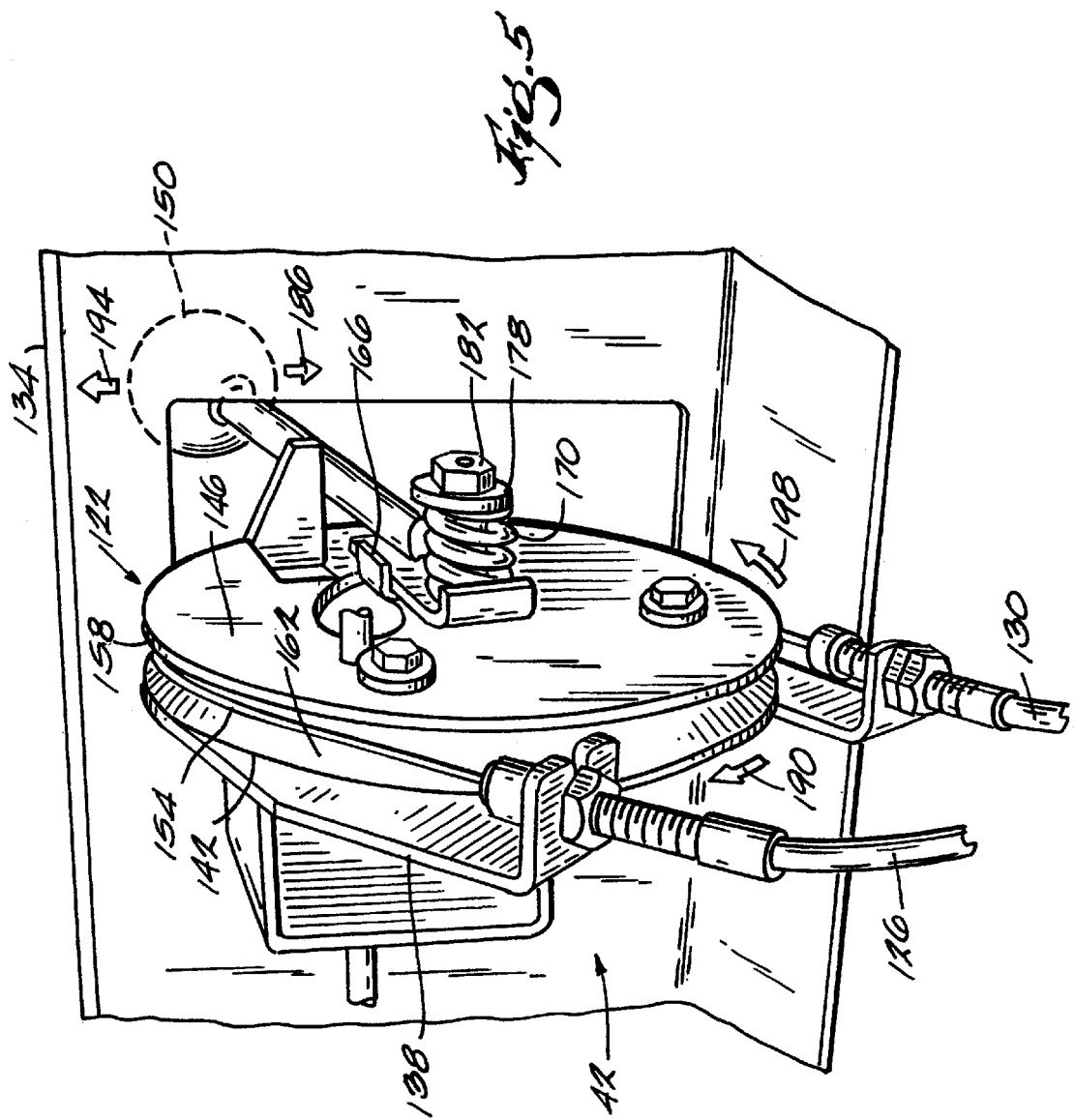
FIG. 5 is a perspective view of the controller assembly of the snow thrower of FIG. 1.
Figure 6:
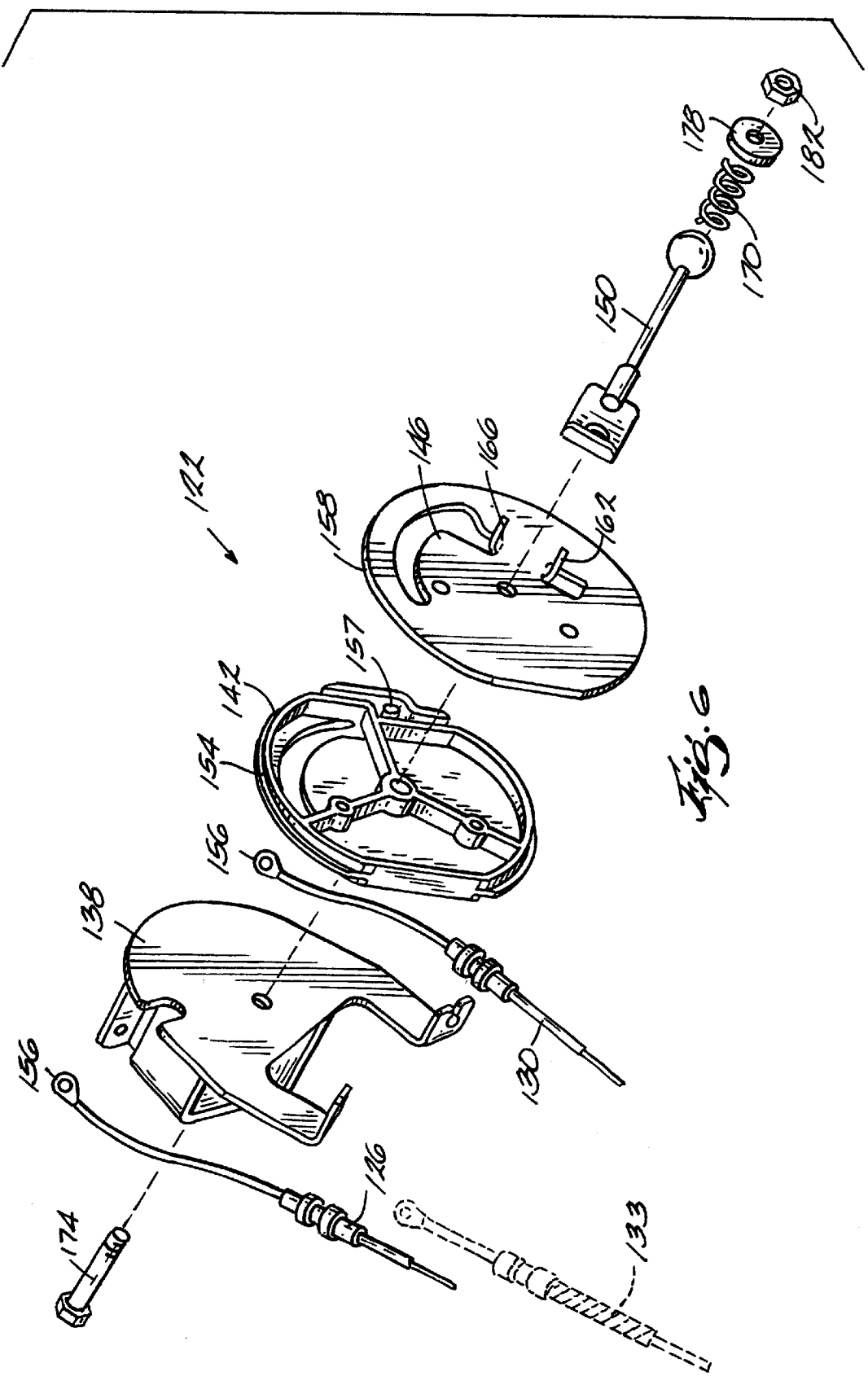
FIG. 6 is an assembly view of the controller assembly of FIG. 5.

As shown in FIG. 5, the controller 122 preferably includes a control bracket 138, a cable guide 142, a shifter plate 146, and a shifter 150. The control bracket 138 is substantially fixed to the control panel 134, and the cable guide 142 is coupled to the control bracket 138 for rotation with respect to the control bracket 138. The cable guide 142 preferably has a cam surface 154 along its outer edge. The cables 126, 130 include loops 156 that are connected to a hook 157 on the cable guide 142, and at least partially wind around a portion of the cam surface 154 in response to rotation of the cable guide 142.

The shifter plate 146 is coupled to the cable guide 142, and rotates along with the cable guide 142 with respect to the control bracket 138. The shifter plate 146 has a peripheral portion 158 that extends beyond the cable guide 142 to create a channel 162 adjacent the cam surface 154, between the shifter plate peripheral portion 158 and the control bracket 138. The channel 162 facilitates winding the cables 126, 130 onto the cam surface 154. The shifter 150 is mounted to the shifter plate 146 between a first and second ear 162, 166. The shifter 150 bears on one of the ears 162, 166 depending on the direction of rotation of the shifter plate 146.

In the preferred embodiment, a spring 170 biases the shifter plate 146 toward the control bracket 138 to apply a sandwiching pressure on the cable guide 142. A bolt 174 passes through the controller 122, and the spring 170 and a washer 178 are placed over the bolt 174. A nut 182 is attached to the bolt 174, and the spring 170 applies increasing pressure on the shifter plate 146 as the nut 182 is tightened onto the bolt 174.

In FIG. 5, the shifter plate 146 and cable guide 142 may rotate with respect to the control bracket 138. The biasing spring 170 applies pressure to hold the shifter plate 146 in any selected position with respect to the control bracket 138, and to resist movement of the shifter 150 from that position. In this regard, the shifter 150 is infinitely adjustable. Alternatively, specific speed settings may be created by providing slots in the control panel 134 that receive the shifter 150.

As mentioned above, the cables 126, 130 convert rotational movement of the controller 122 into translational movement of the carrier 58. As shown in FIGS. 2 and 5, moving the shifter 150 in a first shifter direction 186 rotates the controller 122 in a first rotational direction 190, and moving the shifter 150 in a second shifter direction 194 rotates the controller 122 in a second rotational direction 198.

The cables 126, 130 are coupled to the controller 122 and wind or unwind around the cable guide 142 as the controller 122 rotates. Rotating the controller 122 in the first rotational direction 190 winds the first cable 126 around the cable guide 142, and applies tension to the first cable 126. Likewise, rotating the controller 122 in the second rotational direction 198 winds the second cable 130 around the cable guide 142, and applies tension to the second cable 130. Applying tension to the first cable 126 moves the carrier 58 in a first translational direction 202 (FIG. 2), and applying tension to the second cable 130 moves the carrier 58 in a second translational direction 206 (FIG. 2).

Therefore, moving the shifter 150 in the first shifter direction 186 rotates the controller 122 in the first rotational direction 190, which applies tension to the first cable 126 to move the carrier 58 in the first translational direction 202. Similarly, moving the shifter 150 in the second shifter direction 194 rotates the controller 122 in the second rotational direction 198, which applies tension to the second cable 130 to move the carrier 58 in the second translational direction 206.

What is claimed is:

1. A self-propelled power implement comprising:
   a frame;
   a pair of wheels coupled to said frame for rotation with respect to said frame;
   an internal combustion engine including a rotating output shaft;
   an output disc rotating in response to rotation of said output shaft;
   a friction disc in contact with said output disc, wherein said friction disc is coupled to at least one of said wheels to transmit the rotation of said output disc into rotation of at least one of said wheels;
   a flexible member interconnected with said friction disc;
   a controller coupled to said flexible member, such that movement of said controller causes said flexible member to actuate said friction disc radially with respect to said output disc to vary the speed of rotation of said wheels; and
   a bracket, and a cable guide having a cam surface, wherein said flexible member at least partially winds around a portion of said cam surface in response to movement of said controller, and wherein said cable guide is mounted for rotation with respect to said bracket.

2. The implement of claim 1, further comprising a shifter plate mounted to said cable guide, said shifter plate having a peripheral portion that extends beyond said cable guide, wherein said cable guide is disposed between said shifter plate and said bracket, and wherein said peripheral portion of said shifter plate and said bracket together define a channel facilitating winding said flexible member onto said cam surface.

3. The implement of claim 2, wherein said shifter plate has at least two ears, said implement further comprising a shifter mounted to said shifter plate such that said shifter bears on one of said ears when actuating said friction disc in a first direction, and bears on the other of said ears when actuating said friction disc in a second direction.

4. The implement of claim 2, further comprising a spring biasing said shifter plate toward said bracket and applying a sandwiching pressure on said cable guide.

5. The implement of claim 4, wherein said pressure applied by said spring permits said shifter plate to be substantially infinitely positionable with respect to said bracket within a range of motion of said shifter plate.

6. The implement of claim 1, wherein said flexible member includes first and second cables able to actuate said friction disc in first and second radial directions with respect to said output disc.

7. The implement of claim 6, wherein said friction disc moves in said first direction in response to tension in said first cable, and moves in said second direction in response to tension in said second cable.

8. The implement of claim 1, wherein said controller is remotely positioned with respect to said engine.

9. The implement of claim 1, wherein said flexible member includes a push-pull cable able to actuate said friction disc in first and second radial directions with respect to said output disc.

10. The implement of claim 1, further comprising at least one auger blade rotated in response to rotation of said engine output shaft.

11. A method for adjusting the speed of a wheel for a power implement, the method comprising:
    rotating an output shaft in response to the rotation of an internal combustion engine output shaft;
    rotating a friction disc in response to rotation of the output shaft;
    actuating the friction disc radially with respect to an output disc in response to a force applied through a flexible member;
    rotating the wheel in response to the rotation of the friction disc; and
    wherein the act of actuating includes applying the force through the flexible member by rotating a cable guide having a cam surface, and thereby at least partially winding the flexible member onto the cam surface.

12. The method of claim 11, wherein the act of actuating includes providing a push-pull cable for the flexible member, and moving the friction disc in response to tension and compression forces in the cable.

13. The method of claim 11 wherein the act of actuating includes providing first and second tension cables for the flexible member, and moving the friction disc in a first direction in response to tension forces in the first cable, and in a second direction in response to tension in the second cable.

* * * * *